കുറിപ്പ്

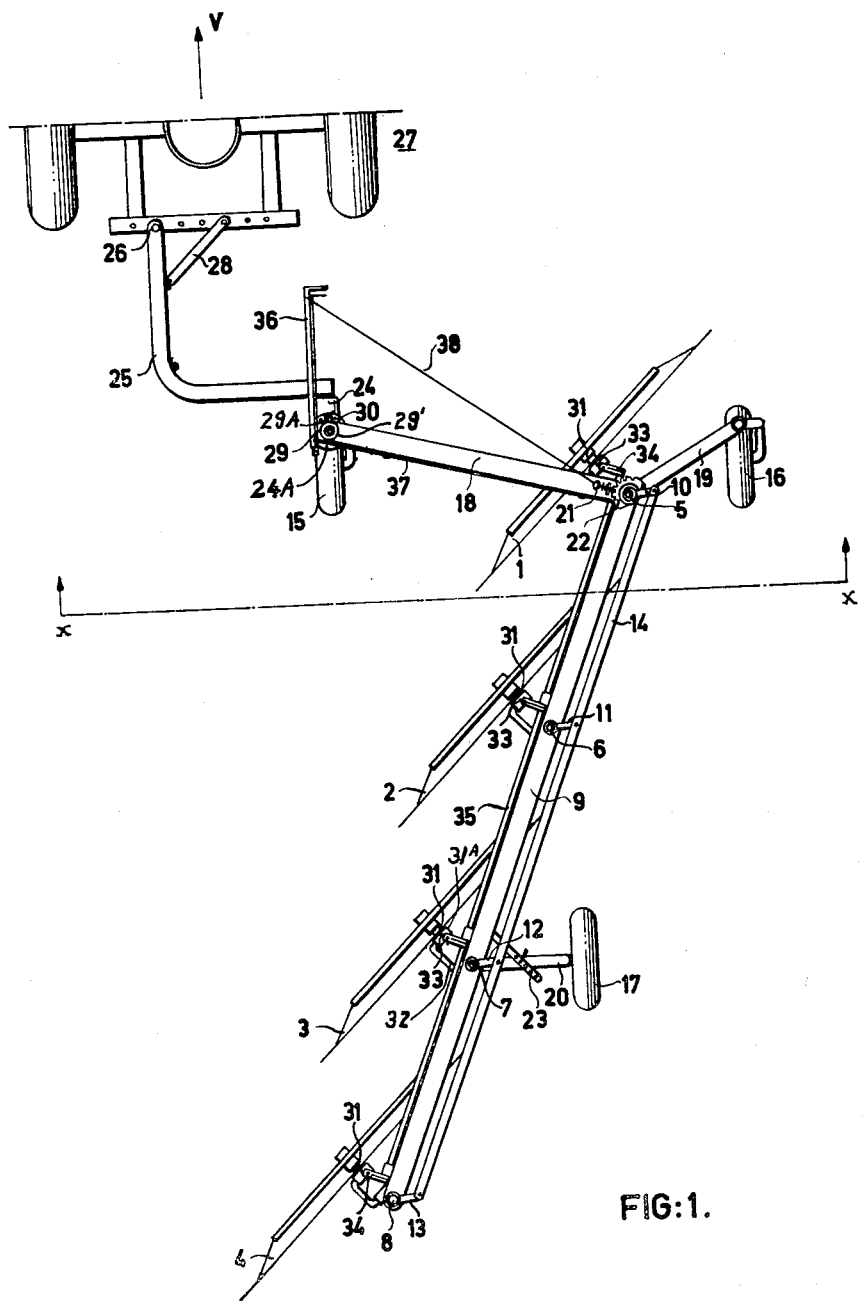
FIG:1.

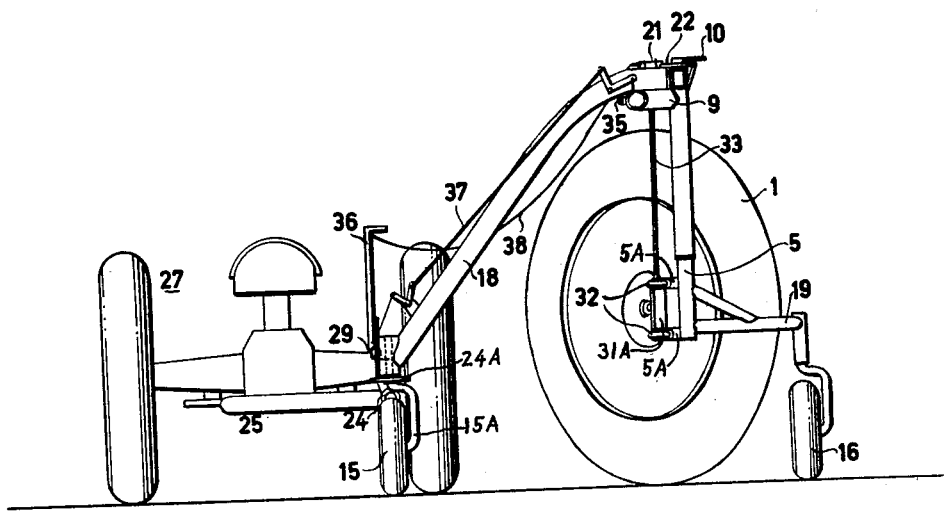
FIG: 2.

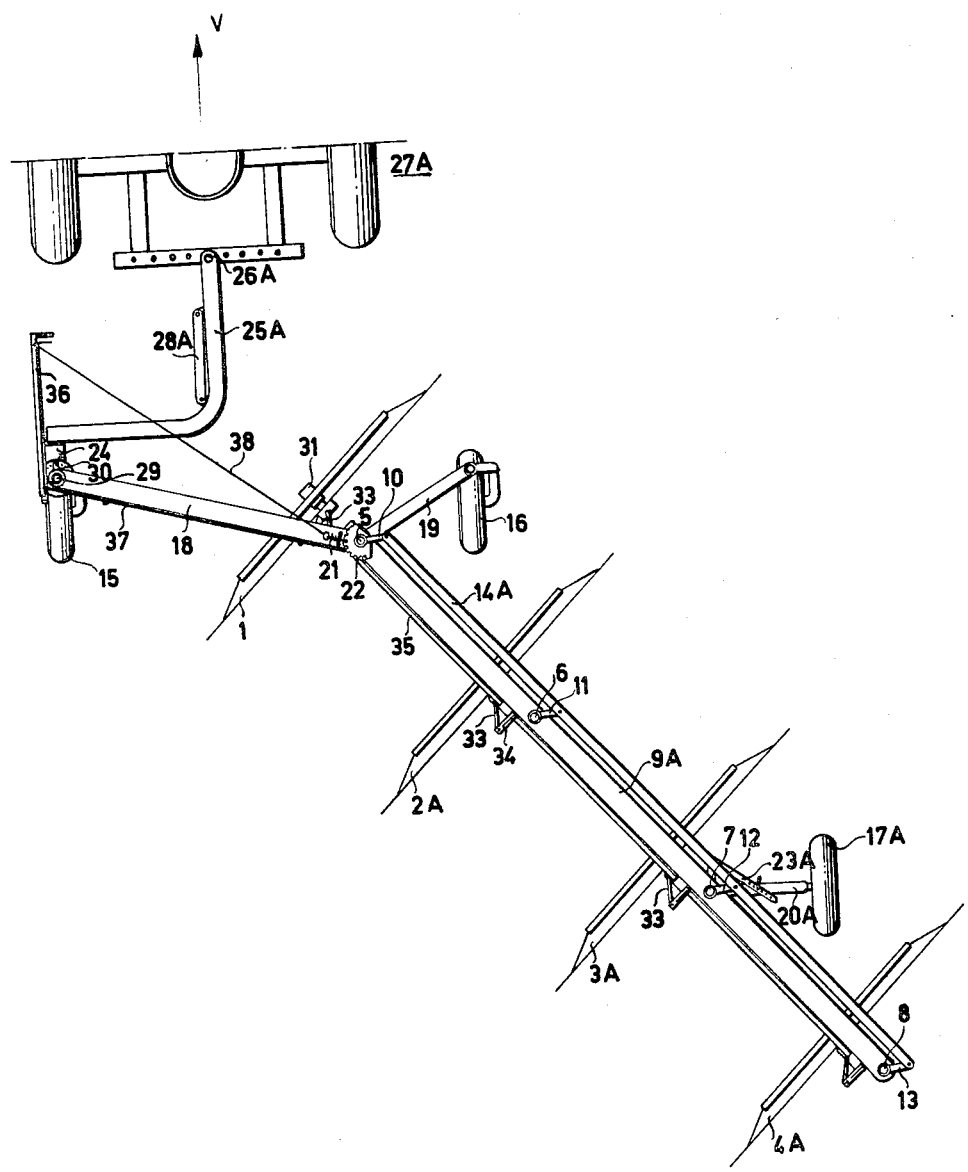
FIG: 3.

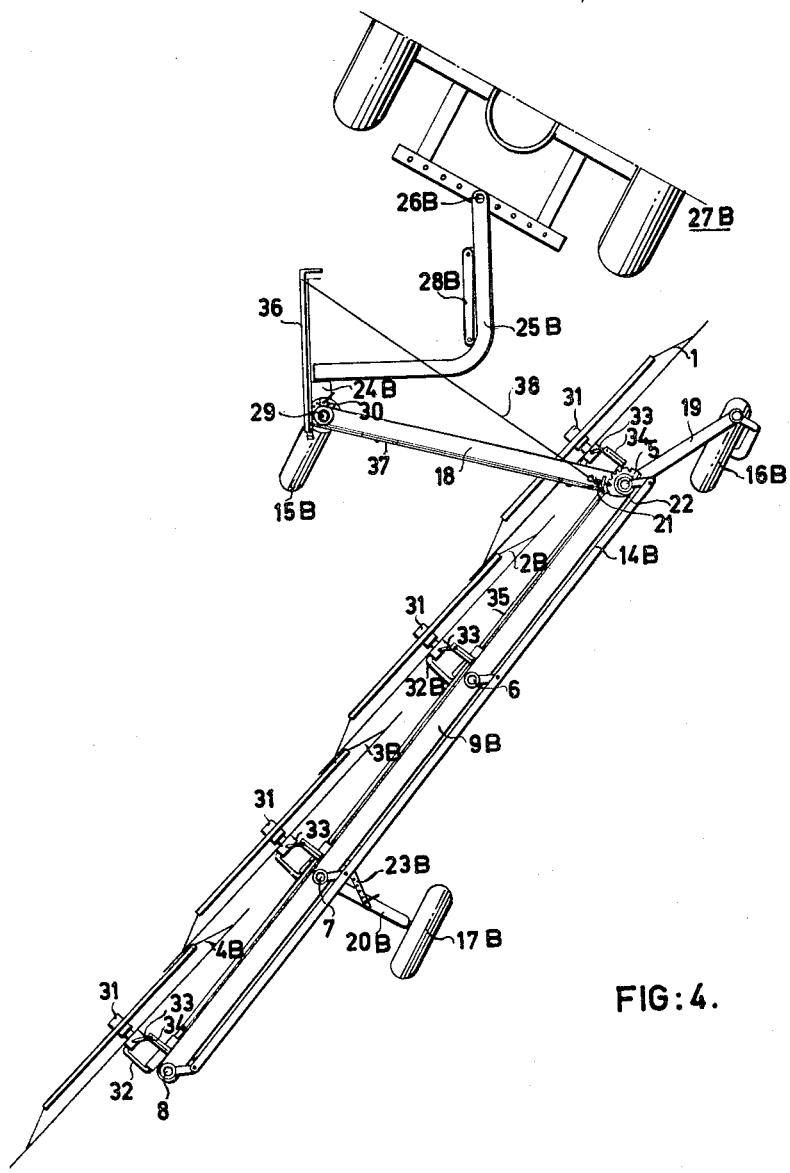
FIG: 4.

United States Patent Office 2,924,060
Patented Feb. 9, 1960

2,924,060

SIDE DELIVERY RAKING DEVICE WITH RAKE WHEEL POSITIONING MEANS

Cornelis van der Lely and Ary van der Lely, both of Maasland, Netherlands, assignors to C. van der Lely N.V., Maasland, Netherlands, a Dutch limited-liability company Application June 26, 1956, Serial No. 593,962

Claims priority, application Netherlands June 29, 1955

11 Claims. (Cl. 56—377)

The invention relates to devices for laterally displacing material lying on the ground by means of a number of raking members which are mounted on a mobile frame. More particularly, the invention is concerned with the provision of raking members capable of pivoting about vertical axles in combination with an arm over which a tractive force can be exerted and which arm is mounted on the frame and rotatable about a vertical axle.

In known devices of this kind, the rake wheels are hand-rotated or pivoted about their associated vertical axles one by one or by means of a special adjusting mechanism.

It is an object of the present invention to provide a device of the described kind in which adjusting of the raking members can take place in a very simple manner. According to the invention a raking member and the associated arm are connected to each other by means of coupling members due to which a turning of the arm causes a turning of the raking member.

An advantage of the invention is that, by means of a tractor or the like, associated raking members can be turned simultaneously, so that a side delivery rake can be changed into a teddering device in a simple manner.

A further advantage of the present invention is that for the various working positions of the device, the application of a tractive force can be conveniently located.

Further advantages of the invention are next more fully described with reference to the drawing in which:

Fig. 1 shows a plan view of a device provided in accordance with the invention,

Fig. 2 shows a section of the device taken along line X—X in Fig. 1,

Fig. 3 is a plan view of the device in a second working position,

Fig. 4 shows the device in transport position.

In Fig. 1, four rake wheels 1, 2, 3 and 4 are mounted on a mobile frame 9 so as to be rotatable or pivotable about vertical axles 5, 6, 7 and 8. Said vertical axles 5, 6, 7 and 8 are provided with projections 10, 11, 12 and 13 and are hingedly connected to a coupling bar 14. The frame is supported by running wheels 15, 16 and 17 which are fixed to vertical axles 5 and 7 by means of the supporting members 18, 19 and 20. By means of a locking pin 21 which is mounted on the supporting member 18 and which locking pin engages a toothed sector 22 fixed to the frame 9, the running wheels and the rake wheels are secured with regard to the frame 9, which also appears in Fig. 2.

The running wheels 15 and 16 are swivel wheels. The running wheel 17 is, on the contrary, not self-adjusting, but the supporting member 20 is attached rotatably relative to the rake wheel 3, and is fixed in position by means of a coupling bar 23. The rake wheel 3 and the running wheel 17 as well are jointly rotatable about the vertical axle 7.

In close proximity to the running wheel 15, a horizontal hinge 24 is provided to which the draw arm 25 is rotatably fixed. Said draw arm 25 is coupled to the tractor 27 by a hinge or pivot 26. Said hinge can be fixed by the bar 28.

A vertical axle 29 (which constitutes a coupling means coupling the pivoting of draw arm 25 to the rake wheels) is mounted above the horizontal hinge 24, and the draw arm 25 is rotatable about said axle 29. The draw arm 25 is adjustably secured to said axle by means of a pin 30, the supporting member 18 constituting a coupling means for coupling the pivoting of draw arm 25 to the rake wheels.

The rake wheels 1, 2, 3 and 4 are supported on axles 31, which axles are mounted on parallelograms 32. As shown in Fig. 2, the parallelograms 32 are constituted by pivotally connected links. Bars 33 are connected between said parallelograms and projections 34 on an axle 35. The axle 35 can be rotated and the rake wheels raised by means of a lever 36 and a system of bars 37.

It is to be noted that the axle 29 constitutes a coupling means between the arm 25 and the supporting member 18. Thus, in effect, axle 29 constitutes a coupling means coupling the draw arm 25 to the rake wheels 1–4.

With further respect to the connection of hinge 24 to supporting member 18, it is to be noted that to the beam 18 is connected a bushing 29' which is provided with a small extension 29A. The extension 29A has an aperture through which pin 30 is inserted. Running wheel 15 is provided with an axle 15A having a vertical extension accommodated by bushing 29'. Between the bushing 29' and the axle 15A, a horizontal plate 24A is mounted to which bushing 24 is attached. Plate 24A is provided with apertures.

Due to the above construction, the arm 25 can be locked in various positions with respect to supporting member 18. In each of these positions, the running wheel 15 is free to swivel in the bushing 29.

With more particular regard to parallelograms 32, it is to be noted that axles 31 are mounted on vertically extending supports 31A which are pivotally connected by two horizontal arms 32 which are pivotally connected to extensions 5A. Extensions 5A are positioned on shafts or axles 5. Supports 31A are connected with vertical bars 33 which are coupled with extensions 34 of rod 35. By rotating rod 35 about its axis, extensions 34 are moved in an upward direction carrying along bars 33. This lifts supports 31A with the rake wheels due to the pivotal connections of arms 32 with supports 31A and extensions 5A.

In Fig. 1, the device works as a side-delivery rake. The tractor 27 is located favorably with regard to the side-delivery rake, because the rake projects from the tractor at one side and because of the fact that it is possible to rake conveniently along the sides of the field. The tractor favorably overcomes the resistance caused by the rake wheels which are obliquely arranged with regard to the direction of travel of the device. The lever 36 is within reach of the seat of the driver.

If it is desired to convert the side-delivery rake into a teddering device by using the engine power of the tractor, the bar 28 can be mounted for eliminating the possibility of turning about the hinge point 26, as is shown in Fig. 1. After that the locking pin 21 is pulled back by means of cord 38. By causing the tractor 27 to make a turn to the right, the frame 9 will be turned about the vertical axle 5. Also the rake wheels 2, 3 and 4 and the running wheel 17 turn with respect to the frame 9 and, after the device reaches the position shown in Fig. 3, the locking pin 21 is released, due to which it again secures the hinge 5. The draw arm 25 as well as the bar 28 are then released from the tractor 27. The draw arm 25 is turned 180° about the hinge axle 24 and is again coupled to the rear of the tractor.

In Fig. 3, the device works as a teddering device. The rake wheels 1, 2A, 3A and 4A each rake a small strip and throw the material aside in a touseled state. The running wheels 15, 16 and 17A have a most favorable position for performing said work. The draw arm 25A imparts to the tractor 27A a favorable position relative to the machine for enabling the same to turn sharply as well as to meet the resistance caused by the rake wheels arranged obliquely with respect to the direction of travel. The lever 36 remains within the reach of the driver of the tractor 27A.

In Fig. 4, the device is shown in transport position. For obtaining said transport position, the locking pin 21 is pulled out of the toothed sector 22. The coupling bar 28B may be connected to the rear end of the tractor 27 and said rear end of the tractor is turned to the right till the position of Fig. 4 is reached. With the locking pin 21 locking the hinge 5 and with the bar 28B of the tractor released, the device can be transported in a favorable manner. In that case, the rake wheels 1, 2B, 3B and 4B are raised, preferably by means of the lever 36. If desired, the draw arm 25B can be adjusted about the vertical hinge 29. After the coupling bar 23B is released, the running wheel 17B together with the supporting member 20B is turned with regard to the rake wheel 3B and fixed by securing the coupling bar 23B. The running wheel 17B then steers the device in a favorable transport position.

What we claim is:

1. A device for laterally displacing material lying on the ground comprising: a mobile frame, a plurality of substantially vertical axles coupled to said frame, a plurality of rake wheels, each of said rake wheels being mounted on one of said vertical axles, a draw arm coupled to said frame and being pivotable thereupon, said draw arm being arranged for the exertion of a tractive force required for forward movement of the device, and coupling means coupling said draw arm to at least one of said vertical axles for coupling the pivoting of the said draw arm with the rotation of said one vertical axle to control a pivoting of the associated rake wheel.

2. A device as defined in claim 1, in which the coupling means and said associated rake wheel are pivotable about the same vertical axle.

3. A device as defined in claim 1, comprising coupling means connected to said axles for mutually coupling the angular movements of said rake wheels about their vertical axles.

4. A device as defined in claim 1, comprising at least one running wheel on and supporting the frame, said running wheel being rotatable about a vertical axle about which is rotatable one of the raking members.

5. A raking implement comprising a mobile frame, a draw arm, first vertical axle means coupling said draw arm to said frame, a rake wheel rotatable about a substantially horizontal axis, second vertical axle means coupling said rake wheel to said frame, and coupling means coupling said first and second vertical axle means together so that a movement of said draw arm about the first vertical axle means controls a movement of said rake wheel about the second vertical axle means to determine the position of the rake wheel relative to said frame.

6. An implement as claimed in claim 5 wherein said first and second vertical axle means are spaced vertical axles, said coupling means being a linkage system coupling the spaced axles.

7. An implement as claimed in claim 5 comprising locking means intermediate said frame and one of said axle means preventing rotation thereof and thereby fixing said rake wheel relative to said frame.

8. An implement as claimed in claim 5 comprising a running wheel coupled to one of said axle means for rotation thereon, said running wheel being rotatable about a horizontal axis for the movement of said frame.

9. An implement as claimed in claim 5 comprising a horizontal arm connecting said rake wheel to said second vertical axle means.

10. An implement as claimed in claim 5 comprising a plurality of additional rake wheels, and a plurality of additional vertical axle means supporting said additional rake wheels on said frame, said coupling means connecting all of said vertical axle means for common rotational movement.

11. An implement as claimed in claim 10 wherein said first axle means is positioned at an end of said frame, said draw arm being a linear member extending away from the end.

References Cited in the file of this patent

UNITED STATES PATENTS

| | | |
|---|---|---|
| 1,580,989 | Alvord | Apr. 13, 1926 |
| 2,597,828 | Spurlin | May 20, 1952 |
| 2,602,280 | Crowe et al. | July 8, 1952 |
| 2,689,446 | Sorrels | Sept. 21, 1954 |